(12) United States Patent
Schleif et al.

(10) Patent No.: US 7,126,462 B2
(45) Date of Patent: Oct. 24, 2006

(54) TOOL AND METHOD FOR MEASURING FORCE ASSOCIATED WITH ENGAGING A CHILD RESTRAINT ANCHORAGE

(75) Inventors: Kurt Schleif, Dearborn, MI (US); Robert Michel, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 10/904,606

(22) Filed: Nov. 18, 2004

(65) Prior Publication Data

US 2006/0103515 A1    May 18, 2006

(51) Int. Cl.
*B60Q 1/00* (2006.01)
(52) U.S. Cl. ............... 340/438; 340/686.1; 73/862.451
(58) Field of Classification Search ............... 340/438, 340/665, 667, 668, 686.1, 686.5; 180/268; 73/862.451; 702/41
See application file for complete search history.

(56) References Cited

U.S. PATENT DOCUMENTS

| | | | | |
|---|---|---|---|---|
| 5,265,909 A | * | 11/1993 | Verbeski | 280/808 |
| 6,311,571 B1 | * | 11/2001 | Norton | 763/862.637 |
| 6,793,032 B1 | * | 9/2004 | Lichtinger et al. | 180/268 |
| 6,843,143 B1 | * | 1/2005 | Steele et al. | 73/862.393 |
| 6,903,286 B1 | * | 6/2005 | Kaijala et al. | 200/85 A |
| 6,993,436 B1 | * | 1/2006 | Specht et al. | 702/41 |

* cited by examiner

*Primary Examiner*—John Tweel, Jr.
(74) *Attorney, Agent, or Firm*—Frank A. MacKenzie

(57) ABSTRACT

A tool for measuring force associated with engaging an anchorage of a child restraint anchorage system of a motor vehicle. The tool includes a force measuring device, an engagement arm having a slot, and a guide mechanism. The engagement arm transmits force to the measuring device when the anchorage is seated within the slot.

20 Claims, 2 Drawing Sheets

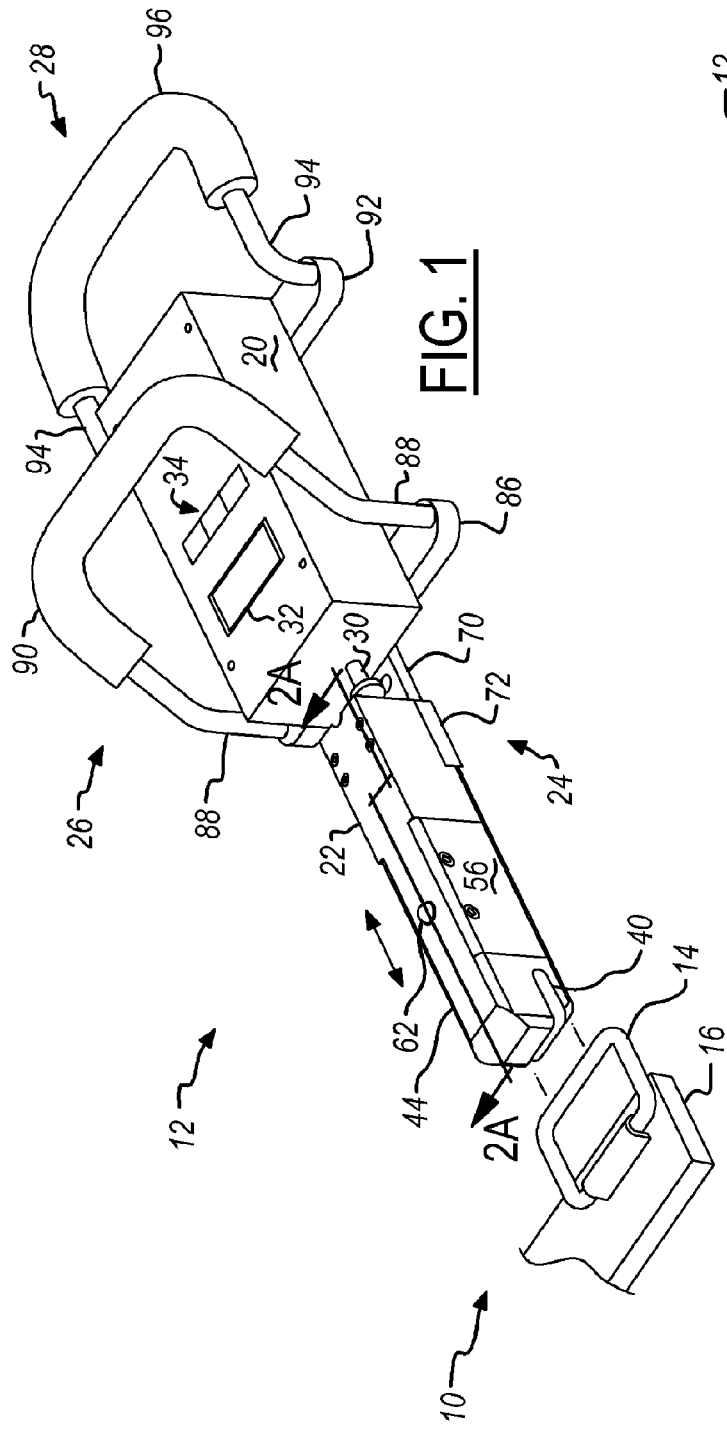
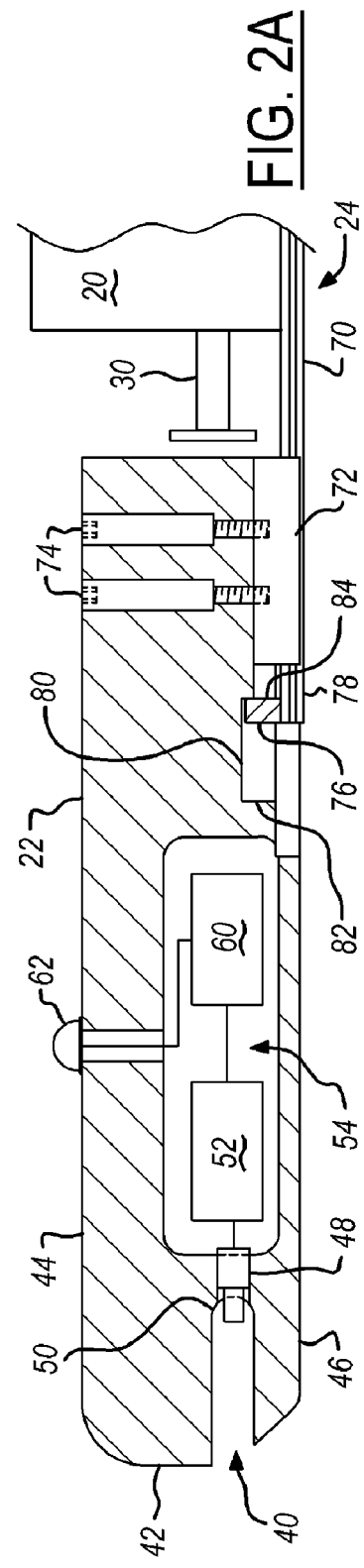

TOOL AND METHOD FOR MEASURING FORCE ASSOCIATED WITH ENGAGING A CHILD RESTRAINT ANCHORAGE

BACKGROUND OF THE INVENTION

1. Field of the Invention

The present invention relates to a tool and a method for measuring force, and more particularly to a tool for measuring force associated with engaging an anchorage of a child restraint anchorage system of a motor vehicle.

2. Background Art

Motor vehicles may include a child restraint anchorage system. A child restraint anchorage system uses a plurality of anchorages to transfer loads from a child safety seat to the vehicle structure. Such anchorages may be located where they are partially concealed by or recessed from the exterior surfaces of a vehicle seat. As a result, a portion of the vehicle seat is deformed or compressed when a child safety seat engages an anchorage. Such deformation or compression increases the installation force required to couple the child safety seat to the anchorage.

Previously, there was no reliable method or apparatus for assessing child safety seat installation forces. As a result, manufacturers modified seats to avoid installation effort issues. More specifically, material was removed around anchorages to reduce interference or low density foam was installed proximate an anchorage to reduce resistive forces encountered when installing a child safety seat. Such modifications increase labor, tooling requirements, and associated costs.

Before applicant's invention, there was a need for a tool and a method for reliably measuring the force or installation effort associated with installing a child safety seat. In addition, there was a need for a tool that could accommodate a variety of anchorage designs, positions, and orientations. In addition, there was a need for a tool that could quickly and efficiently measure installation forces during vehicle development or vehicle assembly. Furthermore, there was a need for an easy to use, ergonomically designed tool that reduces training time and associated costs. Problems associated with the prior art as noted above and other problems are addressed by applicant's invention as summarized below.

SUMMARY OF THE INVENTION

According to one aspect of the present invention, a tool for measuring force associated with engaging an anchorage of a child restraint anchorage system of a motor vehicle is provided. The tool includes a measuring device, an engagement arm, and a guide mechanism. The measuring device, which may be a compression force gauge, is adapted to measure a force. The engagement arm is adapted to receive the anchorage. The guide mechanism connects the measuring device and the engagement arm. The engagement arm transmits force to the measuring device when the engagement arm contacts the anchorage. The tool reliably and quickly measures installation force, accommodates a variety of anchorage designs and configurations, and can be used during vehicle development or vehicle assembly operations.

The guide mechanism may be a linear guide rail assembly configured to allow the engagement arm to move relative to at least a portion of the measuring device.

The engagement arm may include a slot and sensor disposed in the slot for detecting when the anchorage is seated. The engagement arm may also include a chamber configured to receive a battery.

An indicator may be provided for indicating when the anchorage is seated within the slot. The indicator may create a visible or audible signal. The sensor and indicator improve ease of use and simplify operator training by clearly indicating when the anchorage is seated.

The guide mechanism may include a limit pin. The engagement arm may include a limit pin slot adapted to receive the limit pin. The limit pin and limit pin slot may cooperate to limit movement of the engagement arm.

A handle assembly may be disposed proximate a measuring device. The handle assembly improves ease of use when positioning the tool and improves ergonomics.

According to another aspect of the present invention, a tool for measuring an installation force associated with engaging an anchorage of a child restraint anchorage system of a motor vehicle is provided. The tool includes a gauge, an engagement arm, and a linear guide rail assembly. The gauge is adapted to measure a compressive force. The engagement arm has a slot adapted to receive the anchorage. The linear guide rail assembly includes a rail and a carriage. The rail is disposed proximate the gauge. The carriage is adapted to move along the rail and is disposed proximate the engagement arm. The engagement arm exerts force on the gauge when the anchorage contacts the slot.

First and second handle assemblies may be attached to the gauge. The first handle assembly may include a first handle portion disposed above the gauge for supporting the tool. The second handle assembly may include a second handle portion for exerting force to seat the slot against the anchorage.

The rail may include a limit pin. The engagement arm may include a limit pin slot adapted to receive the limit pin. The limit pin and limit pin slot may cooperate to limit movement of the engagement arm. The carriage may be disposed between the gauge and the limit pin.

The gauge may include an input sensor configured to receive force from the engagement arm when the anchorage is seated within the slot.

According to another aspect of the present invention, a method for measuring force associated with engaging an anchorage of a child restraint anchorage system of a motor vehicle with a force measuring tool is provided. The force measuring tool includes a gauge and a guide member. The gauge is adapted to measure a force. The guide member is connected to the gauge and has a slot for receiving the anchorage.

The method includes positioning the slot to receive the anchorage, applying force to seat the anchorage against the slot, and measuring the force exerted between the slot and the anchorage.

The force measuring tool may include a sensor for detecting when the anchorage is seated within the slot and indicator associated with the sensor. The step of applying force may include applying force until the indicator indicates that the sensor detects seating of the anchorage against the slot.

BRIEF DESCRIPTION OF THE DRAWINGS

FIG. 1 is a perspective view of a force measuring tool and an anchorage of a child restraint anchorage system.

FIG. 2A is a section view of a portion of the force measuring tool when the anchorage is not seated in the slot.

DETAILED DESCRIPTION OF THE PREFERRED EMBODIMENT(S)

Figure 2B:
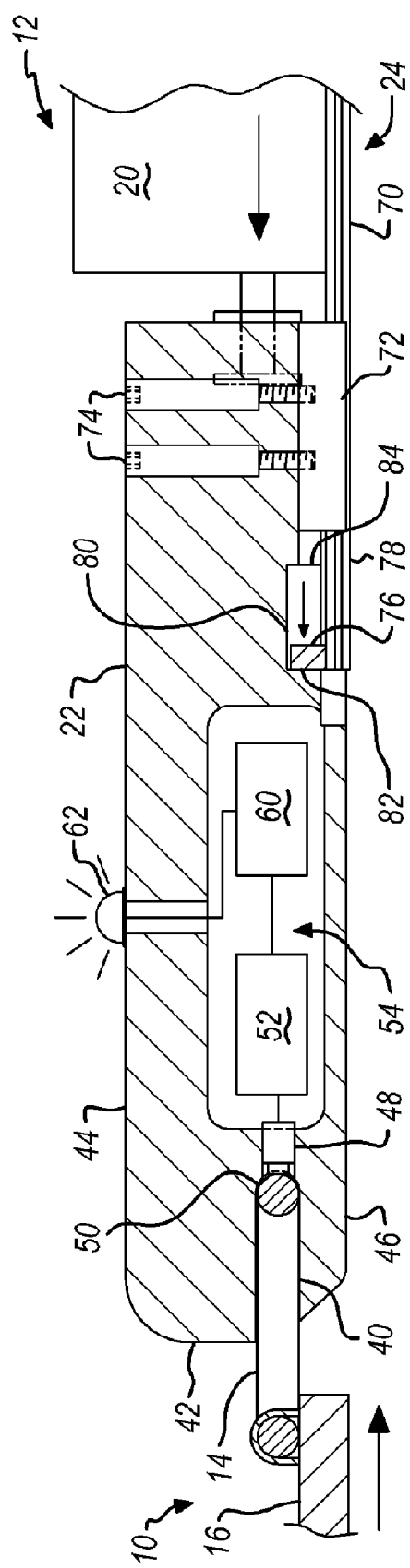
FIG. 2B is a section view of a portion of the force measuring tool with the anchorage seated within the slot.

Referring to FIG. 1, a portion of a child restraint anchorage system 10 and a force measuring tool 12 are shown. The child restraint anchorage system 10 includes one or more anchorages 14 connected to a motor vehicle. The anchorage 14 is adapted to receive a component of a child restraint system, such as a mounting arm of a child safety seat or a tether strap. The anchorage 14 is adapted to transmit force from the child restraint system to the vehicle. In the embodiment shown, an anchorage 14 is coupled to a bracket 16 that is attached to a portion of the vehicle. Alternatively, the bracket 16 may be omitted and the anchorage 14 may be attached to another vehicle component, such as a vehicle seat frame.

The tool 12 includes a measuring device 20, an engagement arm 22, and a guide mechanism 24. In addition, the tool 12 may also include one or more handle assemblies. In the embodiment shown, the tool 12 includes a first handle assembly 26 and a second handle assembly 28. The tool 12 is adapted to measure the installation force associated with engaging the anchorage 14. An acceptable level of installation force may be defined by company, industry, and/or government standards, such as Federal Motor Vehicle Safety Specification 225.

The measuring device 20 may be adapted to measure a compressive force and may have any suitable configuration. For example, a Mark-10 model EG50 force gauge may be employed. In the embodiment shown, the measuring device 20 includes an input feature 30 adapted to receive or measure force, a display 32 for displaying the amount of force measured, and various buttons 34 for configuring the measuring device 20. In addition, the measuring device 20 may include a power source (not shown) for powering the measuring device 20.

The engagement arm 22 includes a slot 40 disposed proximate an end surface 42. Alternatively, the slot 40 may be disposed proximate a top surface 44 or a bottom surface 46 of the engagement arm 22. The slot 40 is adapted to receive the anchorage 14 and may have any suitable configuration. In the embodiment shown, the slot 40 has a generally linear configuration. Alternatively, the slot 40 may be curved or disposed at any suitable angle to facilitate engagement with the anchorage 14. Moreover, the slot 40 may be configured in accordance with manufacturer, industry, or government standards.

Referring to FIG. 2A, the engagement arm 22 is shown in more detail. The engagement arm 22 may include a sensor 48 disposed proximate the slot 40. In the embodiment shown, the sensor 48 is disposed within the slot 40 proximate a slot end surface 50. The sensor 48 may have any suitable configuration. For example, the sensor 48 may be a proximity sensor or a physical contact sensor, such as a Grayhill model 30-UL momentary pushbutton.

The tool 12 may also include a power source 52, such as a battery. The power source 52 may be disposed in any suitable location, such as in the measuring device 20 or the engagement arm 22. In the embodiment shown in FIG. 2A, the power source 52 is disposed in a chamber 54 of the engagement arm 22. In addition, a cover 56 may be provided to conceal the chamber 54 as shown in FIG. 1.

One or more indicators may be associated with the sensor 48 and/or the power source 52. The indicators indicate when the sensor 48 detects that the anchorage 14 is fully seated in the slot 40, such as when the anchorage 14 contacts the slot end surface 50. The indicators may produce an audible, visual, or tactile signal. In the embodiment shown in FIG. 2A, a first indicator 60 and a second indicator 62 are shown. The first and second indicators 60,62 may be of any suitable type and may be disposed in any suitable location. In FIGS. 2A and 2B, the first indicator 60 is a buzzer, such as a Radio Shack model 273-053 75 dB 3 volt buzzer. The second indicator 62 is a light that emits a visible signal. Optionally, the first and/or second indicators 60,62 may be incorporated with the measuring device 20.

The guide mechanism 24 is adapted to couple the measuring device 20 to the engagement arm 22. The guide mechanism 24 may be of any suitable type and may have any suitable configuration. For example, the guide mechanism 24 may be a guide rail assembly adapted to permit the engagement arm 22 to move along a predetermined path relative to the measuring device 20. In the embodiment shown, the guide mechanism is a linear guide rail assembly that includes a rail 70 and a carriage 72 adapted to move along the rail 70. The carriage 72 may be attached to the engagement arm 22 in any suitable manner, such as with one or more fasteners 74.

The rail 70 may be coupled to the mounting device 20 in any suitable manner, such as with one or more fasteners or via the front and/or rear handle assemblies 26,28. In addition, the rail 70 may include a limit pin 76 disposed proximate a distal end 78 of the rail 70. The limit pin 76 cooperates with a limit pin slot 80 of the engagement arm 22 to limit movement of the engagement arm 22 along the rail 70. More specifically, a portion of the limit pin 76 extends into the limit pin slot 80 and contacts front or back surfaces 82,84 of the limit pin slot 80 to limit the movement of the carriage 72 along the rail 70 and to prevent the carriage 72 from sliding off the rail 70.

Referring to FIGS. 2A and 2B, the movement of the engagement arm 22 is depicted. More specifically, the engagement arm 22 is shown in a first or "disengaged" position in FIG. 2A and a second or "engaged" position in FIG. 2B. In the disengaged position, the anchorage 14 is not fully seated within the slot 40, the limit pin 76 is disposed proximate the back surface 84, and the input feature 30 is not receiving force from the engagement arm 22. Moreover, the engagement arm 22 and input feature 30 may be spaced apart in the disengaged position. In the engaged position, the anchorage 14 is seated in the slot 40, the limit pin 76 is disposed proximate the front surface 82, and the engagement arm 22 contacts the input feature 30 to facilitate force measurement.

Referring again to FIG. 1, the front and rear handle assemblies 26,28 are shown in more detail. The front handle assembly 26 includes a front cross member 86, front mounting members 88, and a front handle portion 90. Similarly, the rear handle assembly 28 includes a rear cross member 92, rear mounting members 94, and a rear handle portion 96. The front handle assembly 26 is configured to allow an operator to grasp the front handle portion 90 and support the tool 12. The rear handle assembly 28 is disposed behind the measuring device 20 to facilitate the application of force to seat the slot 40 against the anchorage 14.

The front and rear cross members 86,92 may be disposed on measuring device 20 in any suitable manner, such as with one or more fasteners. Optionally, the front and rear cross members 86,92 may each include a slot (not shown) adapted to receive the rail 70 and capture the rail 70 between the front and rear cross members 86,92 and the measuring device 20.

The front and rear mounting members 88,94 are disposed proximate the front and rear cross members 86,92, respectively, and may have any suitable configuration. In the embodiment shown, the front mounting members 88 are angled away from the engagement arm 22 to facilitate visibility of the display 32 while the rear mounting member 94 is angled to position the rear handle portion 94 behind the measuring device 20.

Figure 3:
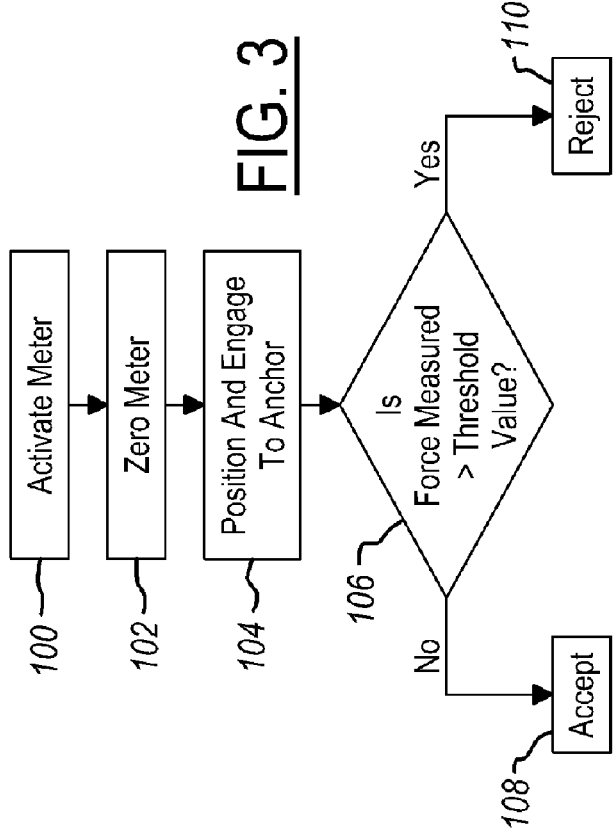
FIG. 3 is a flowchart of a method for measuring force associated with engaging the anchorage with the force measuring tool.

Referring to FIG. 3, a flowchart of a method for measuring force with the force measuring tool 12 is shown.

At 100, the measuring device is activated to facilitate the detection and measurement of a compressive force.

At 102, the measuring device is configured to measure force. More specifically, the measuring device is reset or "zeroed" either automatically upon activation or by pressing an appropriate button. In addition, the measuring device may be set in an appropriate mode, such as a peak compression mode, to display the peak or maximum force detected.

At 104, the tool is positioned to engage the anchorage. More specifically, an operator grasps and positions the tool using the front and rear handle assemblies. Then, the operator applies force primarily with the rear handle to seat the anchorage against the slot in the direction indicated by the arrows pointing from right to left in FIG. 2B. Force may be applied slowly to reduce the presence or magnitude of an impulse force that may affect force measurement. The tool may be positioned at any suitable angle. For instance, the tool may be positioned generally parallel to the seat bottom such that the measuring device is spaced apart from the seat bottom. The engagement arm may contact the seat back and/or seat bottom and compress or deform the contacted surfaces. The indicator or indicators signal when the sensor detects that the anchorage is fully seated within the slot.

At 106, the force measured may be compared to a threshold value. The threshold value may be any suitable value, such as 25 lb. If the force measured is less than the threshold value, then the installation force is acceptable and an acceptance signal may be provided at block 108. If the force measured is greater than the threshold value, then the force measured is unacceptable and a reject signal may be provided at block 110.

The zeroing, positioning, and measurement steps may be repeated a plurality of times to provide multiple data values that may be averaged.

The tool and method of the present invention may be integrated with a vehicle assembly line. More particularly, the tool may communicate a value indicative of the force measured or the rejection signal to an assembly line control system to halt the assembly line so that appropriate remedial actions may be taken.

While the best mode for carrying out the invention has been described in detail, those familiar with the art to which this invention relates will recognize various alternative designs and embodiments for practicing the invention as defined by the following claims.

What is claimed is:

1. A tool for measuring force associated with engaging an anchorage of a child restraint anchorage system of a motor vehicle, the tool comprising:
   a measuring device adapted to measure a force;
   an engagement arm adapted to receive the anchorage; and
   a guide mechanism connecting the measuring device and the engagement arm;
   wherein the engagement arm transmits force to the measuring device when the engagement arm contacts the anchorage.

2. The tool of claim 1 wherein the measuring device is a compression force gauge.

3. The tool of claim 1 wherein the guide mechanism is a linear guide rail assembly configured to allow the engagement arm to move relative to at least a portion of the measuring device.

4. The tool of claim 1 wherein the engagement arm further comprises a slot and a sensor disposed in the slot for detecting when the anchorage is seated within the slot.

5. The tool of claim 4 further comprising an indicator for indicating when the anchorage is seated within the slot.

6. The tool of claim 5 wherein the engagement arm further comprises a chamber configured to receive a battery adapted to power the indicator.

7. The tool of claim 6 wherein the indicator is adapted to create an audible sound.

8. The tool of claim 6 wherein the indicator is a light.

9. The tool of claim 1 wherein the guide mechanism further comprises a limit pin and the engagement arm further comprises a limit pin slot adapted to receive the limit pin, the limit pin and limit pin slot cooperating to limit movement of the engagement arm.

10. The tool of claim 1 further comprising a handle assembly disposed proximate the measuring device.

11. A tool for measuring an installation force associated with engaging an anchorage of a child restraint anchorage system of a motor vehicle, the tool comprising:
    a gauge adapted to measure a compressive force;
    an engagement arm having a slot adapted to receive the anchorage; and
    a linear guide rail assembly having a rail disposed proximate the gauge and a carriage adapted to move along the rail and disposed proximate the engagement arm;
    wherein the engagement arm exerts force on the gauge when the anchorage contacts the slot.

12. The tool of claim 11 further comprising first and second handle assemblies attached to the gauge, the first handle assembly having a first handle portion disposed above the gauge for supporting the tool and the second handle assembly having a second handle portion for exerting a force to seat the slot against the anchorage.

13. The tool of claim 11 wherein the rail further comprises a limit pin and the engagement arm further comprises a limit pin slot adapted to receive the limit pin, the limit pin and limit pin slot cooperating to limit movement of the engagement arm.

14. The tool of claim 13 wherein the carriage is disposed between the gauge and the limit pin.

15. The tool of claim 11 wherein the gauge further comprises an input sensor configured to receive force from the engagement arm when the anchorage is seated within the slot.

16. The tool of claim 11 further comprising a sensor disposed proximate the slot, the sensor being adapted to detect seating of the anchorage against the slot.

17. The tool of claim 11 wherein the slot has a linear configuration.

18. A method for measuring force associated with engaging an anchorage of a child restraint anchorage system of a motor vehicle with a force measuring tool, the force measuring tool having a gauge adapted to measure a force and a guide member connected to the gauge and having a slot for receiving the anchorage, the method comprising:
    positioning the slot to receive the anchorage;
    applying force to the measuring tool to seat the anchorage against the slot; and
    measuring the force exerted between the slot and the anchorage.

19. The method of claim 18 wherein the force measuring tool further comprises a sensor for detecting when the anchorage is seated within the slot and an indicator associated with the sensor, and wherein the step of applying force further comprises applying force until the indicator indicates that the sensor detects seating of the anchorage against the slot.

20. The method of claim 18 further comprising comparing the force measured by the gauge to a threshold value and generating a reject signal if the force is greater than the threshold value.

* * * * *